United States Patent [19]

Erderly et al.

[11] Patent Number: 5,451,450
[45] Date of Patent: Sep. 19, 1995

[54] ELASTIC ARTICLES AND A PROCESS FOR THEIR PRODUCTION

[75] Inventors: Thomas C. Erderly, Baytown; Aspy K. Mehta, Humble, both of Tex.; Jeffrey A. Middlesworth, Wauconda, Ill.

[73] Assignee: Exxon Chemical Patents Inc., Wilmington, Del.

[21] Appl. No.: 92,403

[22] Filed: Jul. 14, 1993

Related U.S. Application Data

[63] Continuation-in-part of Ser. No. 68,374, May 27, 1993, abandoned, which is a continuation-in-part of Ser. No. 837,769, Feb. 19, 1992, Pat. No. 5,241,031.

[51] Int. Cl.$^6$ .................. C08F 210/08; C08F 210/14; B29D 7/00
[52] U.S. Cl. ................................ 428/220; 428/333; 428/500; 428/516; 428/910; 526/160; 526/348.1; 526/348.5; 526/348.6; 156/220; 264/515; 264/563; 264/176.1; 264/210.2; 264/235.6; 264/293; 264/331.17; 528/502

[58] Field of Search ............... 428/333, 516, 910, 220, 428/500; 264/293, 515, 563, 564, 176.1, 210.2, 235.6, 331.17; 526/348.1, 160, 348.5, 348.6; 156/220; 528/502

[56] References Cited

U.S. PATENT DOCUMENTS

| | | | |
|---|---|---|---|
| 5,241,031 | 8/1993 | Mehta | 526/348.1 |
| 5,272,236 | 12/1993 | Lai et al. | 526/160 X |
| 5,283,128 | 2/1994 | Wilhoit | 525/240 X |

OTHER PUBLICATIONS

Schwartz et al, Plastics Materials and Processes Van Nostrand Reinhold Co., N.Y., 506–508, 1982.

*Primary Examiner*—Fred Teskin
*Attorney, Agent, or Firm*—Jaimes Sher

[57] ABSTRACT

Disclosed is an elastic film having improved properties. The elastic film can be blown, cast or cast embossed. The elastic film is processed by polymerizing olefins in the presence of a metallocene catalyst system.

34 Claims, 1 Drawing Sheet

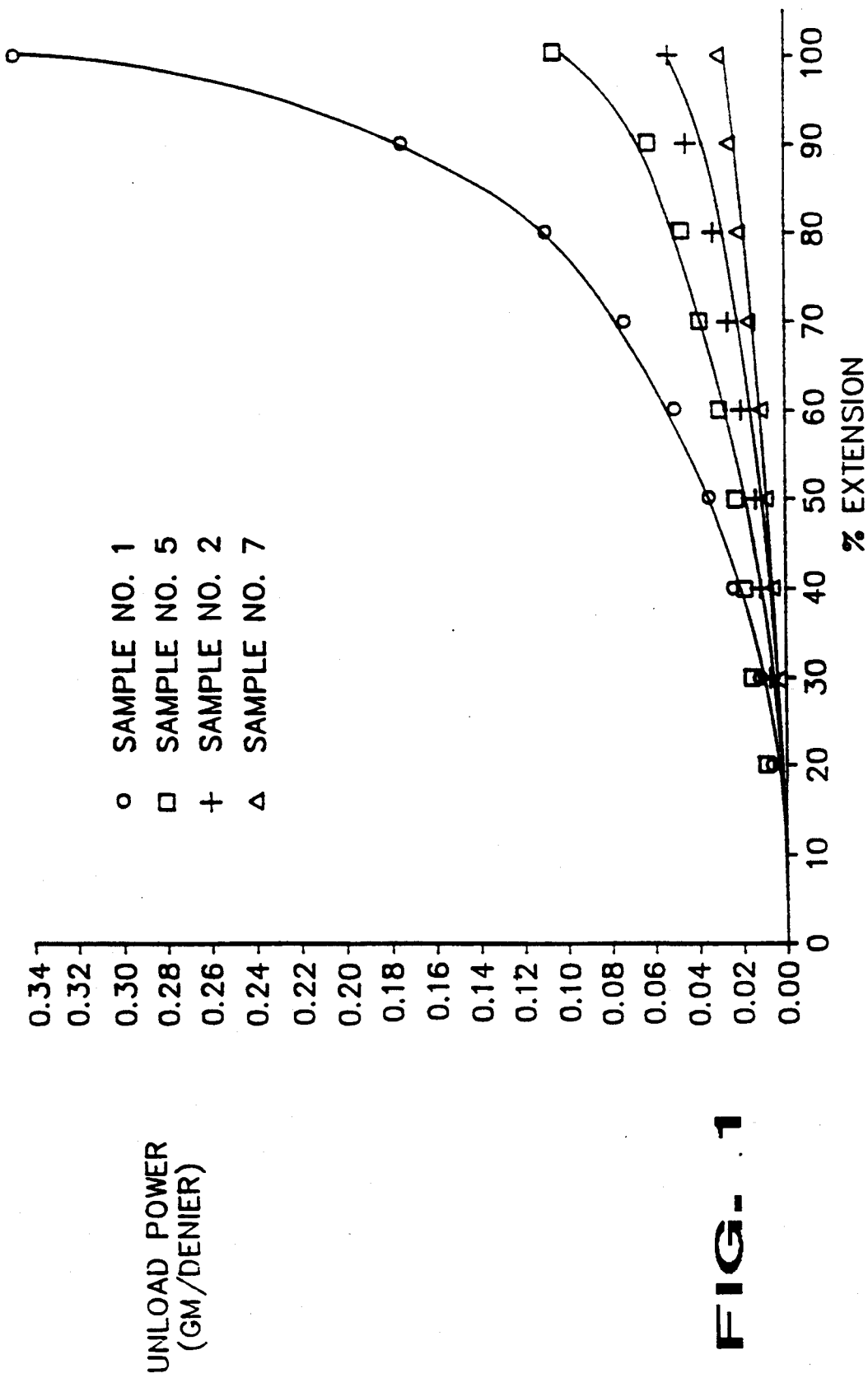

ELASTIC ARTICLES AND A PROCESS FOR THEIR PRODUCTION

CROSS-REFERENCE TO RELATED APPLICATIONS

This application is a continuation-in-part application of U.S. application Ser. No. 08/068,374, filed May 27, 1993 now abandoned which is a continuation-in-part of U.S. application Ser. No. 07/837,769, filed February 19, 1992, now U.S. Pat. No. 5,241,031.

FIELD OF THE INVENTION

This present invention generally relates to elastic articles and a method for their production. This invention also relates to polymers which can be extruded and embossed to form an elastic film.

BACKGROUND OF THE INVENTION

Elastomeric polymers are utilized in a wide variety of applications for which non-elastic polymers are totally unsuited. For example, in articles of clothing, elastomeric polymers are utilized as neck, wrist, waist, ankle and head bands or in elastic laminate structures used where a certain degree of freedom of movement is required. As the garment is worn, the elastic polymer band or elastic laminate structure must have enough "unload power" to hold the garment in place. When the garment is not worn, it is desirable that the elastic polymer band or a plastic laminate patch have a low "residual set" so that the elastic polymer band or elastic laminate structure of the garment returns essentially to its original shape as the garment is worn over a long period of time. In terms of garment applications, these constraints dictate which of those elastomeric polymer compositions now known can be fabricated into article forms which can be placed into applications in garments.

"Unload power" is an important elastic tensile property in elastic applications, particularly for use in garments. For example, in diaper applications, the unload power of an elastomeric article provides an indication of the retractive force which holds the elastomeric article which is part of the diaper leg of the garment against an infant's body. In all elastomeric materials, the unload power is lower than the "load power" or modulus (the force required to extend the strip). This difference shows up as a "hysteresis" (i.e. the force to extend is different than the force to hold in place) and is larger for synthetic elastomers than for natural rubber. "Residual set" refers to the change between the length of an elastomeric material before and after its extension to a certain length for a certain time for a certain number of cycles. For example, the residual set is the percent change in length of an elastic film after extension of the film to 150–200 percent of its initial length through 2-6 cycles. Each cycle would consist of extending the film to 150–200 percent of its initial length, holding the film extended for a time period, releasing the extending force, and allowing the film to return to its original shape for a time period.

Typical elastic materials utilized for clothing applications include polyurethanes, ethylene-propylene rubbers (EP or EPR), including ethylene-propylene-diene terpolymers (EPDM), and natural rubbers.

Polyurethanes have the desired unload power, residual set and repeatability for use in most garment applications. However, Polyurethanes have a relatively high specific gravity, which results in a lower yield of polyurethane articles hence a higher cost as compared to comparable lower specific gravity polymers. Furthermore, where the garment is to be used once and discarded, such as with surgical garments or disposable diapers, polyurethane's as an element thereof are overengineered for the desired use of that garment and thus overly expensive. For garment applications, conventional EP's and EPDM's have very poor intrinsic physical properties for such applications and generally must be blended with a plastic material such as low density polyethylene, linear low density polyethylene or ethylene vinyl acetate copolymers. Ideally, in such garment applications an EP and/or EPDM which does not require blending is desired.

Elastomeric SBC's (styrenic block copolymers) also have the disadvantage in that they cannot be drawn to the desired thickness and also have to be blended with other materials, polymers, such as EVA's, EMA's, or LDPE plastomers to achieve the desired processability.

For polyurethanes, EP's and EPDM's, to get an "accordion" shape or "gather" formation, such as around the leg opening of a disposable diaper, it has been necessary to expose that portion of the overall garment article to heat to cause shrinkage of the elastomeric article of the garment. Conventional, elastic materials require a relatively high shrinkage temperature. In addition, many of them require prestretching for good gather formation. Exposing a garment article to such a relatively high temperature may be detrimental to the overall properties of the garment. Further, the commonly used elastic materials generally have to be melt glued to achieve bonding to the garment, such as to a polyolefin layer in the garment. Controlled heat bonding to such a polyolefin substrate, if possible, would be advantageous.

A need exists for an elastic article that can be economically utilized in disposable garment applications. There also exists a need for use in garment applications for an elastic article with a relatively low shrinkage temperature. Additionally, there exists a need for an elastic article that can be heat bonded/sealed to polyolefins. A need still exists for elastic articles of optimum quality for particular uses.

The invention generally relates to elastic materials made from metallocene catalysts. Such materials are produced by conventional blown or cast film processes, as well as cast embossed. Thus, eliminating costly post extrusion or compounding steps.

SUMMARY OF THE INVENTION

A method for producing an elastic film, said method comprising the steps of introducing ethylene, a $C_3$–$C_{20}$ alpha-olefin or a $C_3$ to $C_{20}$ polyene and a metallocene catalyst into a polymerization reactor under polymerization conditions selected to yield a polymer having a density in the range of about 0.855 $g/cm^3$ to about 0.900 $g/cm^3$, and a CDBI of at least 45 percent; removing said polymer from said reactor; converting said polymer into a film. In one embodiment of the invention, the elastic film has improved unload power and residual set produced by blown, cast or cast embossed processes.

BRIEF DESCRIPTION OF THE DRAWINGS

FIG. 1 is a plot of the unload power at various extensions up to 100 percent for elastic samples Nos. 1, 2, 5 and 7.

DETAILED DESCRIPTION OF THE INVENTION

Introduction

The present invention is directed toward an elastic film wherein the need for a post extrusion step is eliminated. In one embodiment of the invention, the elastic film is made from a single resin plastomer. Some elastic films of the invention have improved unload power and residual set without the need of blending.

In another embodiment, the film comprises a copolymer of ethylene polymerized with at least one comonomer selected from the group comprising $C_3$ to $C_{20}$ alpha-olefins and/or $C_3$ to $C_{20}$ polyenes, wherein the copolymer has a density in the range of about 0.855 g/cm$^3$ to about 0.900 g/cm$^3$, a melt index in the range of about 0.5 dg/min to about 1000 dg/min, and a Composition Distribution Breadth Index (CDBI) at least about 45 percent.

Production of the Resins

In the invention, the type of elastomer utilized will depend upon economics and the properties desired in the final end product. Generally the elastomer can be any of the group consisting of plastomer, styrene-butadiene copolymer, polychloroprene (neoprene), nitrile rubber, butyl rubber, polysulfide rubber (Thiokol), cis-1,4-polyisoprene, ethylene-propylene co and terpolymers (EPR and EPDM rubber), silicone rubber and polyurethane rubber or blends of them with other polymers. In the preferred embodiment, the elastomer utilized in the present invention is a plastomer. The term "plastomer" as used herein refers generally to a class of ethylene based polymers with density of less than about 0.900 g/cm$^3$ (down to about 0.855 g/cm$^3$) at a molecular weight, Mw, greater than about 20,000 (about 200 MI and lower). Plastomers have an ethylene crystallinity between linear low density plastics and very low density polyethylenes and ethylene/alpha-olefin elastomers.

Generally, the alpha-olefins suitable for use in the invention contain in the range of about 2 to about 20 carbon atoms, preferably, in the range of about 3 to about 16 carbon atoms, most preferably in the range of about 3 to about 8 carbon atoms. Illustrative non-limiting examples of such alpha-olefins are propylene, 1-butene, 1-pentene, 4-methyl-1-pentene, 1-hexene, 1-octene and 1-dodecene and the like.

The plastomer utilized in the invention is selected from the group of polymers consisting of ethylene polymerized with at least one comonomer selected from the group consisting of $C_3$ to $C_{20}$ alpha-olefins and/or $C_3$ to $C_{20}$ polyenes. Preferably, the plastomer utilized in the present invention is selected from the group of polymers consisting of ethylene polymerized with at least one comonomer selected from the group consisting of $C_3$ to $C_{20}$ alpha-olefins. The types of monomers selected in the plastomer in the invention will depend upon economics and the desired end use of the resultant fabricated material. The polyene utilized in the invention has in the range of about 3 to about 20 carbon atoms, preferably in the range of about 4 to about 20 carbon atoms, most preferably in the range of about 4 to about 15 carbon atoms. In one embodiment, the polyene is a diene, that has in the range of about 3 to about 20 carbon atoms. Preferably, the diene is a straight chain, branched chain or cyclic hydrocarbon diene having from about 4 to about 20 carbon atoms, preferably from about 4 to about 15 carbon atoms, and more preferably in the range of about 6 to about 15 carbon atoms. Most preferably, the diene is a nonconjugated diene. Examples of suitable dienes are straight chain acyclic dienes such as: 1,3-butadiene, 1,4-hexadiene and 1,6-octadiene; branched chain acyclic dienes such as: 5-methyl-1,4-hexadiene, 3,7-dimethyl-1,6-octadiene, 3,7-dimethyl-1,7-octadiene and mixed isomers of dihydro myricene and dihydroocinene; single ring alicyclic dienes such as: 1,3-cyclopentadiene, 1,4-cylcohexadiene, 1,5-cyclooctadiene and 1,5-cyclododecadiene; and multi-ring alicyclic fused and bridged ring dienes such as: tetrahydroindene, methyl tetrahydroindene, dicylcopentadiene, bicyclo-(2,2,1)-hepta-2-5-diene; alkenyl, alkylidene, cycloalkenyl and cycloalkylidene norbornenes such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornene. Particularly preferred dienes are 1,4-hexadiene, 5-ethylidene-2-norbornene, 5-vinyllidene-2-norbornene, 5-methylene-2-norbornene and dicyclopentadiene. The especially preferred dienes are 5-ethylidene-2-norbornene and 1,4-hexadiene.

Preferably, the plastomers utilized in the material of the invention are either ethylene/alpha-olefin copolymers or ethylene/alpha-olefin/diene terpolymers. Illustrative non-limiting examples of suitable copolymers are those such as ethylene/butene-1, ethylene/hexene-1, ethylene/octene-1, and ethylene/propylene copolymers. Suitable examples of terpolymers include ethylene/propylene/1,4-hexadiene and ethylene/butene-1/1,4-hexadiene. In one embodiment the plastomer is a single resin.

The plastomers suitable in the present invention with desired monomer levels can be prepared by polymerization of the suitable monomers in the presence of supported or unsupported catalyst systems. Preferably the catalyst system utilized is a metallocene catalyst system.

In the preferred embodiment, the elastomer utilized in the invention is a plastomer that is an ethylene based polymer made from a transition metal metallocene catalyst. There are a number of structural variables which affect the ultimate properties of the plastomer. Two of the most important are composition distribution (CD) and molecular weight distribution (MWD). Composition distribution refers to the distribution of comonomer between copolymer molecules. This feature relates directly to polymer crystallinity, optical properties, toughness and many other important use characteristics. MWD plays a significant role in melt processability as well as the level and balance of physical properties achievable. Also important is the molecular weight (MW) of the polymer, which determines the level of melt viscosity and the ultimately desired physical properties of the polymer. The type and amount of comonomer also effects the physical properties and crystallinity of the copolymer.

The plastomers utilized in the present invention may be made by any suitable process which allows for the proper control of the above mentioned structural features (MW, MWD, CD, comonomer type and amount) to yield the desired polymer with the desired elastics properties. One suitable method is through the use of a class of highly active olefin polymerization catalysts known as transition metal metallocenes.

Metallocenes are well known especially in the preparation of polyethylene and copolyethylene-alpha-olefins. These catalysts, particularly those based on Group IV transition metals, zirconium, titanium and hafnium, show extremely high activity in ethylene polymerization. The metallocene catalysts are also highly flexible in that, by manipulation of catalyst composition and reaction conditions, they can be made to provide polyolefins with controllable molecular weights from as low as about 200 (useful in applications such as lube oil additives) to about 1 million or higher, as for example in ultra high molecular weight linear polyethylene. At the same time, the molecular weight distribution of the polymers can be controlled from extremely narrow (as in a polydispersity, $M_w/M_n$, of about 2), to broad (as in a polydispersity of about 8).

For the purposes of this patent specification the term "metallocene" is herein defined to contain one or more cyclopentadienyl moiety in combination with a transition metal of the Periodic Table of Elements. The metallocene catalyst component is represented by the general formula $(C_p)_m MR_n R'_p$ wherein $C_p$ is a substituted or unsubstituted cyclopentadienyl ring; M is a Group IV, V or VI transition metal; R and R' are independently selected halogen, hydrocarbyl group, or hydrocarboxyl groups having 1–20 carbon atoms; $m=1-3$, $n=0-3$, $p=0-3$, and the sum of $m+n+p$ equals the oxidation state of M. Various forms of the catalyst system of the metallocene type may be used in the polymerization process of this invention. Exemplary of the development of these metallocene catalysts for the polymerization of ethylene is found in the disclosure of U.S. Pat. No. 4,871,705 to Hoel, U.S. Pat. No. 4,937,299 to Ewen, et al. and EP-A-0 129 368 published Jul. 26, 1989, and U.S. Pat. Nos. 5,017,714 and 5,120,867 to Welborn, Jr. all of which are fully incorporated herein by reference. These publications teach the structure of the metallocene catalysts and includes alumoxane as the cocatalyst. There are a variety of methods for preparing alumoxane of which one described in U.S. Pat. No. 4,665,208. Other cocatalysts may be used with metallocenes, such as trialkylaluminum compounds; or ionizing ionic activators or compounds such as, tri (n-butyl) ammonium tetra (pentaflurophenyl) boron, which ionize the neutral metallocene compound. Such ionizing compounds may contain an active proton, or some other cation associated with but not coordinated or only loosely coordinated to the remaining ion of the ionizing ionic compound. Such compounds are described in EP-A-0 277 003 and EP-A-0 277 004 both published Aug. 3, 1988 and are both herein fully incorporated by reference. Further, the metallocene catalyst component can be a monocyclopentadienyl heteroatom containing compound. This heteroatom is activated by either an alumoxane or an ionic activator to form an active polymerization catalyst system to produce polymers useful in this present invention. These types of catalyst systems are described in, for example, PCT International Publications WO 92/00333 published Jan. 9, 1992, U.S. Pat. Nos. 5,096,867 and 5,055,438, EP-A-0 420 436 and WO 91/04257 all of which are fully incorporated herein by reference. In addition, the metallocene catalysts useful in this invention can include non-cyclopentadienyl catalyst components, or ancillary ligands such as boroles or carbollides in combination with a transition metal. Additionally it is not beyond the scope of this invention that the catalysts and catalyst systems may be those described in U.S. Pat. No. 5,064,802 and PCT publications WO 93/08221 and WO 93/08199 published Apr. 29, 1993 all of which are herein incorporated by reference. All the catalyst systems described above may be, optionally, prepolymerized or used in conjunction with an additive or scavenging component to enhance catalytic productivity.

The catalyst particles in a gas phase process may be supported on a suitable particulate material such as polymeric supports or inorganic oxide such as silica, alumina or both. Methods of supporting the catalyst of this invention are described in U.S. Pat. Nos. 4,808,561, 4,897,455, 4,937,301, 4,937,217, 4,912,075, 5,008,228, 5,086,025 and 5,147,949 and U.S. application Ser. Nos. 898,255, filed Jun. 15, 1992 now U.S. Pat. No. 5,238,892 and 885,170, filed May 18, 1992, now U.S. Pat. No. 5,240,894 all of which are herein incorporated by reference. The preferred support method in a gas phase process is generally disclosed in U.S. Pat. No. 4,937,301 and related U.S. patents which are listed above.

The preferred catalyst, catalyst system and process is described in detail in U.S. Pat. No. 5,084,534 herein fully incorporated by reference.

It is generally preferred to use catalyst compositions at a concentration so as to provide from about 1 ppm to about 5000 ppm, most preferably 10 ppm to 300 ppm, by weight of transition metal based on the weight of monomers in the polymerization of the ethylene polymers.

The precise monomer content of the plastomers utilized in the invention will depend upon economics and the desired applications of the resultant materials. Typically the plastomers utilized in the invention will generally comprise in the range of about 50 mole percent to about 93 mole percent ethylene (based on the total moles of monomer), preferably, the plastomers have a minimum of 60 mole percent, more preferably, 70 mole percent ethylene and a maximum of about 91 mole percent, more preferably, 88 mole percent ethylene.

In the preferred embodiment the plastomers have an ethylene crystallinity less that about 35 percent, preferably less than about 20 percent.

Characteristics of the Resins

The plastomers of the present invention have a density in the range of about 0.855 g/cm$^3$ to about 0.900 g/cm$^3$. Preferably, the plastomers have a minimum density of about 0.860 g/cm$^3$, more preferably about 0.865 g/cm$^3$, and a maximum density of about 0.890 g/cm$^3$, more preferably about 0.880 g/cm$^3$. Preferably the density is in the range of about 0.860 g/cm$^3$ to about 0.890 g/cm$^3$, more preferably, the density is in the range of about 0.865 g/cm$^3$ to about 0.880 g/cm$^3$. Densities were measured using ASTM D-1505 procedure, except that they were additionally conditioned by holding the resin for 48 hours at ambient temperature (23° C.) prior to density measurement.

The melt index (MI) of the plastomers utilized in the invention are such that the plastomers can be extruded into a desired end product. In the preferred embodiment, the MI must be such that the plastomer will have sufficient drawability as desired. Generally the melt index is in the range of about 0.2 dg/min to about 1000 dg/min, preferably, the MI is at least about 0.5 dg/min, more preferably at least about 1 dg/min, preferably, the maximum MI is about 20 dg/min, more preferably about 5 dg/min. In another embodiment the MI is in the range of about 0.5 dg/min to about 50 dg/min, and more preferably in the range of about 1 dg/min to about 5 dg/min. MI as measured herein was determined according to ASTM D-1238 (190/2.16). High load MI was determined according to ASTM D-1238 (190/21.6).

The plastomers utilized in the invention have a molecular weight distribution in a ratio of $M_w/M_n$ in the range of about 1.5 to about 30, preferably in the range of about 1.8 to about 10, and more preferably in the range of about 2.0 to about 4.0.

A key characteristic of the resins of the present invention is their composition distribution. As is well known to those skilled in the art, the composition distribution of a copolymer relates to the uniformity of distribution of comonomer among the molecules of the copolymer. Metallocene catalysts are known to incorporate comonomer very evenly among the polymer molecules they produce. Thus, copolymers produced from a catalyst system having a single metallocene component have a very narrow composition distribution—most of the polymer molecules will have roughly the same comonomer content, and within each molecule the comonomer will be randomly distributed. Ziegler-Natta catalysts, on the other hand generally yield copolymers having a considerably broader composition distribution. Comonomer inclusion will vary widely among the polymer molecules.

CDBI is a measure of composition distribution. CDBI is defined as the weight percent of the copolymer molecules having a comonomer content within 50% (that is, 25% on each side) of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci. Poly. Phys. Ed.*, vol. 20, p. 441 (1982), which is incorporated herein by reference.

To determine CDBI, a solubility distribution curve is first generated for the copolymer. This may be accomplished using data acquired from TREF techniques described above. This solubility distribution curve is a plot of the weight fraction of the copolymer that is solubilized as a function of temperature. This is converted to a weight fraction versus composition distribution curve. For the purpose of simplifying the correlation of composition with elution temperature the weight fractions less than 15,000 are ignored. These low weight fractions generally represent a trivial portion of the plastomer of the present invention. The remainder of this description and the appended claims maintain this convention of ignoring weight fractions below 15,000 in the CDBI measurements.

From the weight fraction versus composition distribution curve the CDBI is determined by establishing what weight percent of the sample has comonomer content within 25% each side of the median comonomer content. Further details of determining CDBI of a copolymer are known to those skilled in the art, see, for example, PCT Patent Application WO 93/03093, published Feb. 18, 1993.

The composition distribution breadth index (CDBI) of the plastomers utilized in the present invention is generally about 45 percent or higher, preferably, the CDBI is about 50 percent or higher and more preferably, the CDBI is about 60 percent or higher, and most preferably, about 70 percent or higher.

The benefits to the discovery of the subject invention that accrue from the structural features of plastomers alluded to above (vis-a-vis molecular weight distribution, composition distribution, molecular weight, comonomer type and amount) are as follows. The narrow molecular weight distribution provides high strength and good draw down. The narrow composition distribution (a high CDBI value) provides low tackiness and a low melting temperature/melting range (for heat shrinkage and "gather" formation at relatively low temperatures). The comonomer incorporation level in plastomers affords low specific gravity for high end product yields (e.g., yards/lb of polymer). Yet, plastomers have modest levels of ethylene crystallinity (around 20%) which give rise to orientability and strength in the fabricated elastic articles. Control of the molecular weight allows control of orientation and elasticity.

Production of Films

In another embodiment, the invention provides a fabrication method for increasing the unload power and residual set of an elastic material. In yet still another embodiment, the films of the invention are made from a single resin plastomer. According to ASTM definitions relating to rubbers, elastic materials are considered those materials which rapidly return to approximately their initial dimensions and shape after substantial deformation by a weak stress and release of the stress. In the preferred embodiment the elastic materials of the invention are considered to be those which when stretched to one and half to twice their original length (1.5–2X) at room temperature (18° C. to 29° C.) and held at 1.5–2X for one minute, will retract to less than 1.0X within one minute after the deforming force is released.

The invention is directed toward an elastic film having improved unload power and residual set produced by blown, cast or embossed extrusion processes. The film is formed by any suitable method well known in the art, or once formed, the film can be subjected to a combination of post orienting and/or annealing to effect changes in its unload power. Such methods of making film are discussed by J. H. Briston and L. L. Katan in *Plastic Films*, (2nd ed. 1983) and U.S. Pat. Nos. 4,436,520 and 5,066,526, all of which are herein incorporated by reference. Commonly known methods of producing film include casting (extrusion and solvent), calendering and extrusion methods, such as blow, slit extrusion or cast die extrusion.

The invention in another embodiment is suitable for improving the unload power of thin elastic articles. Such thin elastic articles are commonly known as ribbon, tape, film, strip, sheet, and the like. The difference between these particular terms is generally dimensional. For example, tape is generally thought of as being narrower than film. For the purposes of this patent specification, the terms "ribbon", "tape", "film", "sheet" and "strip" are generally interchangeable.

A unique embodiment of the present invention, is its ability to be embossed during the extrusion process without "draw resonance" problems encountered with conventional pure LLDPE and VLDPE's. This embodiment has been demonstrated using plastomers in the range of 0.865 g/cm$^3$ to 0.900 g/cm$^3$ which before would have been unheard of without blending with other olefins. Also 3-D patterns can be produced at low embossed roll temperatures (80° F.) versus conventional 120°–130° F. process temperatures. For the purposes of this patent specification, the total draw down ratio is defined to be the die gap width divided by the total film thickness. In the invention, the total draw down ratio is in the range of about 2:1 to 100:1, and preferably in the range of about 10:1 to 100:1, preferably in cast films, 4:1 to 20:1 and for blown film preferably 10:1 to 60:1. The films of this invention are embossed at a temperature of about 50° F. to about 140° F., preferably, in the range of 60° F. to 115° F., more preferably 70° F. to 110° F. and most preferably 80° F. to 100° F. Film thickness is generally in the range of 0.1 to 15 mils, preferably 0.5 to 10, most preferably less than 5 or 2 mils and most preferably from 0.5 to 4 mils. The films of the invention process at line speeds in the range of 500 ft/min to 2000 ft/min, preferably greater than 500 ft/min, more preferably greater than 600 ft/min, even more preferably at 700 ft/min and most preferably greater than 800 ft/min.

Regardless of the method of first producing the film, once made, the film can be used as is, or it can be further processed to improve unload power of the film. This is accomplished by a combination of orienting and/or annealing the film. In one embodiment, the annealing is conducted at a temperature between the film softening point and melting point.

Orientation of non-elastic films such as polypropylene, polystyrene, nylon and polyethylene terephthalate to improve clarity, impact strength and, particularly in the case of polypropylene, its barrier properties, is well known in the art.

The orienting and annealing of the film may be carried out monoaxially in the machine direction (MD) or the transverse direction (TD) or in both directions (biaxially) either simultaneously or sequentially using conventional equipment and processes following cooling of the film.

Blown films are preferentially stretched in machine direction or in both directions. Cast films are preferably stretched in the machine direction. Generally, for orientation in the machine direction, the film is passed around two rollers driven at different surface speeds and finally to a take up roller. The second driven roller which is closest to the take up roll is driven faster than the first driven roller. As a consequence the film is stretched between the driven rollers. Conventional "godet" stands as are well known in the art may also be utilized.

Film orientation in another embodiment may also be carried out in a tentering device with or without machine direction orientation to impart transverse direction orientation in the film. The film is gripped by the edges for processing through the tentering device. For most final applications, the film is monoaxially oriented in the machine direction.

The morphology of the plastomer derived films can be viewed as a matrix of amorphous material interspersed with crystallites. For orienting it is generally necessary that the film be heated to between its softening point and its melting point. This heating is necessary to allow extension or orientation to be induced into the film. Since the temperature is between the film softening point and melting point, the smaller imperfect crystallites will melt, whereas larger more perfect crystallites of the plastomer will remain. The molecules in the amorphous matrix become oriented or extended depending on the draw ratio and other material and fabrication parameters.

In one embodiment, the film of the invention is annealed at a temperature between the film softening point and melting point. The annealing step is necessary to anneal or perfect the crystallites that survived the orienting step and to relax out stresses. This annealing aids in maintaining the orientation or extension induced in the orienting step. The annealing temperature is preferably less than the orienting temperature. Generally once the film leaves the annealing step, ambient cooling is sufficient. In most cases, the film from the annealing step is then spooled in a winding unit.

EXAMPLES

In order to provide a better understanding of the present invention including representative advantages thereof, the following examples are offered as related to actual tests performed in the practice of this invention, and illustrate the suprising and unexpected elastic properties of the invention and are not intended as a limitation on the scope of the invention.

Examples 1-6

Table 1 shows the description of samples used in these examples. All materials were fabricated on the ¾" Haake Rheocord extruder, model E in the cast mode. The screw was a 15/5/5, 24:1 L/D with 15° Tip. The polymer was extruded through a 4" tape die and wound through a stacked calendar assembly to the winder. All polymers contained an additives package of: 30,000 ppm antiblock; 3000 ppm slip; and 500 ppm antioxidant. Die gap width=20 mils. All materials were extruded at ~180° C. melt.

The hysteresis testing procedure used is described as follows. This method is an Exxon variation of a procedures described by DuPont in its brochure on its polyether urethane elastic product, T-722A. In the Exxon variation, 1 inch ×6 inch strips are subjected to a strain rate of 150% or 200% with a jaw gap separation of 2" and cross head speed of 20"/min. The hysteresis stress/strain curve is plotted on a chart also traveling a 20"/minute. Both the extension and retraction crosshead speeds (20"/min) were the same and performed on an Instron model 1123. The film was held for 60 seconds at maximum extension and then retracted and held for 30 seconds relaxation prior to the next cycle. This was repeated 2½ times. Key pieces of information that are extracted from these stress/strain plots are the maximum force (modulus) of each cycle, the residual set or permanent set (the degree of deformation as measured by the point of stress divided by total strain/cycle), and the unload force or contractive power as measured from the last retraction cycle at various elongations. Generally, five specimens were tested for each sample, with mean values over these samples developed.

Table 2 summarizes the results, and as can be seen, both the 0.865 dg/cm$^3$ and 0.874 dg/cm$^3$ plastomer (samples 3 and 4) compare favorably to sample 2 (SBS/EVA) in permanent set and modulus. While sample 1 (pure SBS) has a lower set, it could not be drawn below 5 mils or be fabricated in commercial scale-up on the 3½" Black Clawson cast/embossed line. Tensile set and modulus deteriorated rapidly between the 0.874 g/cm$^3$ density and 0.885 g/cm$^3$ density plastomer, as well as EVA's as demonstrated in samples 5 and 6. This can be primarily attributed to the higher degree of $C_2$ crystallinity.

Examples 7-12

Table 3 shows the description of samples used in these examples. All were fabricated on a commercial 3½", 30:1 L/D Black Clawson cast/embossed line. Screw type was a 30:1 L/D sterlex medium work barrier screw with maddock mixing element. The die was a 42″ EDI slot coat hanger die with 15 mil gap setting. Embossing was by a 36″×60″ pins up micropattern finish roll set to an 80° F. embossing temperature using a 30″×60″ rubber roll nip. Nip pressure was kept constant at ~25 psi. All polymers contained an additives package of 30,000 ppm antiblock, 1-3000 ppm slip, and 500 ppm antioxidant.

Hysteresis testing was the same as described in samples 1-6. The two samples not tested or fabricated from samples 1-6 described above were samples 1-6. Neither could be fabricated in this process.

Table 4 is a summary of the results obtained from hysteresis testing.

It is not beyond the scope of the invention to blend the resins of the films of the invention with other materials such as LLDPE, LDPE, HDPE, PP, PB, EVA, SBS and the like. The films of the invention include blown or cast films in monolayer or multilayer construction formed by coextrusion or lamination.

While the present invention has been described and illustrated by reference to particular embodiments thereof, it will be appreciated by those of ordinary skill in the art that the invention lends itself to variations not necessarily illustrated herein. For example, it is not beyond the scope of this invention to include additives with the claimed films or to blend or coextrude the claimed films with other polymers or even laminate the claimed films to other materials such as metal foils, paper, non-wovens, other polymer films and the like. For this reason, then, reference should be made solely to the appended claims for purposes of determining the true scope of the present invention.

TABLE 1

PROCESS SUMMARY - HAAKE TAPES

| Sample ID | 001 | 002 | 003* | 004* | 005* | 006* | Comments |
|---|---|---|---|---|---|---|---|
| Grade | Vector 7400D | EXX-500D | WS-90125 | WS-90124 | Exact-4011 | LD-767.36 | |
| Comonomer | SBS (31/69 SB) | SBS/EVA | EB/ | EB/ | EB/ | EVA | |
| MI | 8.0 | 4.5 | 6.0 | 4.5 | 2.2 | 3.2 | |
| Density | .930 | .940 | .865 | .874 | .885 | VA 29.5% VA | |
| Process | Cast | Cast | Cast | Cast | Cast | Cast | All material |
| Gauge (mils) | 5+ | 2.0 | 2.16 | 2.02 | 2.16 | 2.35 | processed well |
| Die Gap (mils) | 20 | 20 | 20 | 20 | 20 | 20 | except sample 1. |
| Total Draw down ratio | 4 | 10 | 9.26 | 9.1 | 9.26 | 8.51 | High tack and |
| Melt (°C.) | 188 | — | 186 | 187 | 206 | 208 | could not be |
| Head Pressure (PSI) | 1400 | 540 | 1160 | 1160 | 980 | 840 | drawn down |
| Torque (m/g) | 36 | 10 | 33 | 32 | 32 | 22 | below 5 mils due to |
| RPM | 32 | 20 | 32 | 32 | 32 | 32 | melt strength. |

*SSC = single site metallocene catalyst
NOTE: Total draw down ratio in this case is defined as the die gap width (mils) divided by final film thickness (mils)

TABLE 2

MD HYSTERESIS RESULTS - HAAKE TAPES (150% EXTENSION)

| Sample ID | 001* | 002 | 003 | 004 | 005 | 006 |
|---|---|---|---|---|---|---|
| Grade/Material | SBS/Vector 7400 | EXX-500D/SBS-EVA | WS-90125/EB | WS-90124/EB | Exact 4011/EB | LD-767.36/29.5% EVA |
| MI/Density | 8.0/.930 | 6.22/.94 | 6.0.865 | 4.5/.874 | 2.2/.885 | 3.2/— |
| Permanent Set (%) | | | | | | |
| 1st cycle | 6.5 | 19.44 | 16.2 | 17.6 | 41.2 | 47.9 |
| 2nd cycle | 6.8 | 23.25 | 20.4 | 21.8 | 46.1 | 52.7 |
| Load Force (kg) 1st cycle | | | | | | |
| +50% | .481 | .431 | .449 | .463 | .649 | 1.121 |
| +100% | .54 | .463 | .499 | .526 | .694 | 1.389 |
| +150% | .585 | .49 | .535 | .572 | .74 | 1.679 |
| Load Force (kg) 2nd cycle | | | | | | |
| +50% | .254 | .127 | .172 | .172 | 0 | 0 |
| +100% | .372 | .268 | .308 | .326 | .376 | .394 |
| −150% | .49 | .422 | .458 | .49 | .662 | 1.289 |
| Unload Force (kg) | | | | | | |
| −50% | .212 | 0 | .007 | .006 | 0 | 0 |
| −100% | .327 | .104 | .131 | .137 | .062 | .011 |
| −150% | .48 | .31 | .363 | .404 | .5 | .942 |
| Gauge (mils) | 5+ | 2.0 | 2.16 | 2.02 | 2.16 | 2.35 |

*Difficult to process - could not be drawn < 5 mils

TABLE 3

PROCESS SUMMARY - 3½″ BLACK CLAWSON CAST EMBOSSED LINE

| Sample ID | 007* | 008* | 009* | 010* | 011* | 012 | Comments |
|---|---|---|---|---|---|---|---|
| Grade | WS-90124 | WS-90124 | WS-90124 | WS-90125 | Exact 4011 | EXX-7 | |
| Comonomer | EB | EB | EB | EB | EB | SBS/EVA | |
| MI | 4.5 | 4.5 | 4.5 | 6.0 | 2.2 | 4.4 | |
| Density | .874 | .874 | .874 | .865 | .885 | .949 | |
| Process | Embossed | Embossed | Embossed | Embossed | Embossed | Cast | All samples |
| Gauge (mils) | 3.2 | 2.4 | 1.6 | 2.4 | 2.4 | 2.0 | (7-11) displayed |
| Die Gap (mils) | 15 | 15 | 15 | 15 | 15 | 15 | excellent draw |
| Total Draw down ratio | 4.69 | 6.25 | 9.38 | 6.25 | 6.25 | 7.5 | down w/o draw |

TABLE 3-continued

| PROCESS SUMMARY - 3½" BLACK CLAWSON CAST EMBOSSED LINE | | | | | | | |
|---|---|---|---|---|---|---|---|
| Line speed (fpm) | 81 | 109 | 173 | 110 | 110 | 123 | resonance. Sample |
| Melt (F) | 442 | 441 | 442 | 435 | 459 | 383 | 12 could not be |
| RPM | 27 | 27 | 27 | 27 | 29.4 | 41 | drawn < 2.0 mils. |
| Head Pressure (PSI) | 2130 | 2110 | 2130 | 1744 | 3360 | 1900 | |
| Exit Load (amps) | 144 | 142 | 143 | 119 | 197 | 80 | |

*SSC = single site metallocene catalyst
NOTE: Total draw down ratio is defined as the die gap width (mils) divided by final film thickness (mils).

TABLE 4

| MD HYSTERESIS RESULTS - BLACK CLAWSON (150% EXTENSION) | | | | | | |
|---|---|---|---|---|---|---|
| Sample ID | 007 | 008 | 009 | 010 | 011 | 012 |
| Grade/Comonomer | WS-90124 | WS-90124 | WS-90124 | WS-90125 | Exact 4011 | EXX-7 |
| Comonomer | EB | EB | EB | EB | EB | SBS/EVA |
| MI/Density | 4.5/.974 | 4.5/.974 | 4.5/.974 | 6.0.865 | 2.2/.885 | 4.4/.949 |
| Permanent Set (%) | | | | | | |
| 1st cycle | 16.6 | 16.6 | 16.6 | 14.5 | 45 | 17.3 |
| 2nd cycle | 20.8 | 22.9 | 20.8 | 18.7 | 51 | 19.7 |
| Load Force (kg) | | | | | | |
| 1st cycle | | | | | | |
| +50% | .590 | .463 | .327 | .386 | .868 | — |
| +100% | .659 | .518 | .377 | .431 | .918 | — |
| +150% | .709 | .563 | .409 | .468 | .968 | 309 |
| Load Force (kg) | | | | | | |
| 2nd cycle | | | | | | |
| +50% | .231 | .177 | .118 | .172 | 0 | — |
| +100% | .440 | .336 | .236 | .286 | .459 | — |
| −150% | .627 | .490 | .356 | .404 | .913 | 266 |
| Unload Force (kg) | | | | | | |
| −50% | 0 | 0 | 0 | 0.0175 | 0 | — |
| −100% | .336 | .122 | .081 | .118 | .022 | .05 |
| −150 | .495 | .386 | .277 | .322 | .681 | .1 |
| Gauge (mils) | 3.2 | 2.4 | 1.6 | 2.4 | 2.4 | 2.0 |

What is claimed is:

1. An embossed elastic film consisting essentially of a plastomer having a density in the range of 0.865 g/cm$^3$ to less than about 0.900 g/cm$^3$, a melt index in the range of about 0.2 dg/min to about 1000 dg/min and a CDBI greater than 45 percent.

2. The film of claim 1 wherein said film is oriented to a total draw down ratio in the range of 2:1 to 100:1.

3. The film of claim 2 wherein said film is between about 0.5 mils to about 15 mils in thickness.

4. The film of claim 1 wherein said plastomer is a single resin.

5. The film of claim 1 wherein said film is embossed at a temperature in the range of about 80° F. to about 100° F.

6. The film of claim 1 wherein the plastomer has a density in the range of from about 0.865 g/cm$^3$ to about 0.890 g/cm$^3$.

7. The film of claim 1 wherein the plastomer has a density in the range of from about 0.865 g/cm$^3$ to about 0.880 g/cm$^3$.

8. The film of claim 1 wherein the plastomer has a melt index in the range of about 0.5 dg/min to about 50 dg/min.

9. The film of claim 1 wherein the plastomer has a melt index in the range of about 1 dg/min to about 20 dg/min.

10. The film of claim 1 wherein the plastomer has a CDBI greater than 60 percent.

11. The film of claim 1 wherein the plastomer has a CDBI greater than about 70%.

12. An embossed elastic blown film comprising: a plastomer having a density in the range from about 0.86 g/cm$^3$ to less than about 0.900 g/cm$^3$ and a CDBI greater than 60 percent formed by the polymerization of ethylene and at least one alpha-olefin comonomer in the presence of transition metal metallocene catalyst, said film being oriented to a total draw down ratio in the range of from about 2:1 to 100:1 during extrusion.

13. The film of claim 12 wherein said plastomer has a CDBI greater than about 70 percent.

14. The film of claim 12 wherein said plastomer is a single resin.

15. The film of claim 12 wherein said catalyst is activated with an alumoxane cocatalyst or an ionic activator.

16. The film of claim 12 wherein said film is a multilayer film.

17. The film of claim 12 wherein the plastomer has a density in the range of from about 0.865 g/cm$^3$ to about 0.890 g/cm$^3$.

18. The film of claim 12 wherein the plastomer has a density in the range of from about 0.865 g/cm$^3$ to about 0.880 g/cm$^3$.

19. The film of claim 12 wherein the plastomer comprises in the range of about 60 mole percent ethylene to about 91 mole percent ethylene.

20. The film of claim 12 wherein the alpha-olefin is 1-hexene.

21. The film of claim 12 wherein the alpha-olefin is 1-butene.

22. A process for producing an elastic film, said process comprising the steps of:
a) polymerizing an alpha-olefin and at least one comonomer in the presence of a metallocene catalyst under polymerization conditions to produce a plastomer having a density in the range of 0.865 g/cm$^3$ to about 0.900 g/cm$^3$, a melt index in the range of 0.2 dg/min to about 1000 dg/min and a CDBI greater than 45 percent;

b) extruding said plastomer through a die into a film; and c) embossing said film.

23. The process of claim 22 wherein said film is embossed at a temperature in the range of about 50° F. to about 110° F.

24. The process of claim 22 wherein said film is embossed at a temperature in the range of about 60° F. to about 100° F.

25. The process of claim 22 wherein said film has more than one layer.

26. The process of claim 22 wherein said film passes through said die into a tube shaped film and cooled in a blown film tower.

27. A product produced by the process of claim 22.

28. A product produced by the process of claim 26.

29. The process of claim 22 wherein the plastomer has a density in the range of from about 0.865 g/cm$^3$ to about 0.890 g/cm$^3$.

30. The process of claim 22 wherein the plastomer has a density in the range of from about 0.865 g/cm$^3$ to about 0.880 g/cm$^3$.

31. The process of claim 22 wherein the plastomer has a CDBI greater than 60 percent.

32. The process of claim 22 wherein the plastomer has a CDBI greater than about 70%.

33. The process of claim 22 wherein the plastomer has a melt index in the range of about 0.5 dg/min to about 50 dg/min.

34. The process of claim 22 wherein the plastomer has a melt index in the range of about 1 dg/min to about 20 dg/min.

* * * * *